United States Patent
Bolte et al.

(10) Patent No.: US 7,156,461 B2
(45) Date of Patent: Jan. 2, 2007

(54) VEHICLE SEAT WITH BACK REST

(75) Inventors: Andreas Bolte, Zweibruecken (DE);
Jochen Diemer, Hochspeyer (DE);
Gerhard Flory, Annweiler (DE);
Thomas Geisel, Rottenburg (DE);
Daniel Hippel, Winnweiler (DE);
Thomas Weber, Kaiserslautern (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/506,776

(22) PCT Filed: Feb. 19, 2003

(86) PCT No.: PCT/EP03/01646

§ 371 (c)(1),
(2), (4) Date: May 24, 2005

(87) PCT Pub. No.: WO03/074317

PCT Pub. Date: Sep. 12, 2003

(65) Prior Publication Data

US 2005/0225142 A1    Oct. 13, 2005

(30) Foreign Application Priority Data

Mar. 7, 2002  (DE) ................. 102 09 936

(51) Int. Cl.
*A47C 1/02* (2006.01)
(52) U.S. Cl. ............... 297/344.1; 297/440.2; 297/378.13; 296/65.13; 296/65.17
(58) Field of Classification Search ............. 297/353, 297/354.12, 357, 410, 463.1, 463.2, 440.2, 297/378.13; 296/65.03, 65.15, 65.17, 65.18
See application file for complete search history.

(56) References Cited

U.S. PATENT DOCUMENTS

| | | | | |
|---|---|---|---|---|
| 2,515,261 A * | 7/1950 | Poskin | ................ | 297/364 |
| 4,968,092 A * | 11/1990 | Giambrone | ................ | 297/151 |
| 5,007,678 A * | 4/1991 | DeKraker | ................ | 297/353 |
| 5,246,272 A * | 9/1993 | Kato et al. | ................ | 297/364 |
| 5,630,650 A * | 5/1997 | Peterson et al. | ................ | 297/353 |
| 5,823,621 A * | 10/1998 | Broadhead | ................ | 297/354.13 |
| 5,853,222 A * | 12/1998 | Roslund et al. | ................ | 297/353 |
| 5,879,043 A * | 3/1999 | Radue et al. | ................ | 296/65.17 |
| 6,012,776 A * | 1/2000 | Schneider et al. | ................ | 297/378.12 |
| 6,302,482 B1 * | 10/2001 | Moll et al. | ................ | 297/340 |
| 6,367,859 B1 | 4/2002 | Flory et al. | | |

FOREIGN PATENT DOCUMENTS

| | | |
|---|---|---|
| DE | 33 31 472 A1 | 3/1985 |
| DE | 197 40 776 C1 | 10/1998 |
| DE | 199 49 728 A1 | 4/2001 |
| FR | 1 452 002 | 8/1966 |
| FR | 2 524 285 | 10/1983 |
| FR | 2 778 876 | 11/1999 |
| GB | 2 095 984 | 10/1982 |
| JP | 58-85730 | 5/1983 |

OTHER PUBLICATIONS

German Office Action dated Jul. 19, 2006 including English translation of pertinent portion (Five (5) pages).

* cited by examiner

*Primary Examiner*—Laurie K. Cranmer
(74) *Attorney, Agent, or Firm*—Crowell & Moring LLP

(57) ABSTRACT

A vehicle seat has a backrest which is mounted displaceably in the vehicle by a sliding block guide. In order to enable a vehicle seat of compact configuration to be easily fitted, the backrest has a locking mechanism which secures the backrest releasably in the sliding block guide.

15 Claims, 4 Drawing Sheets

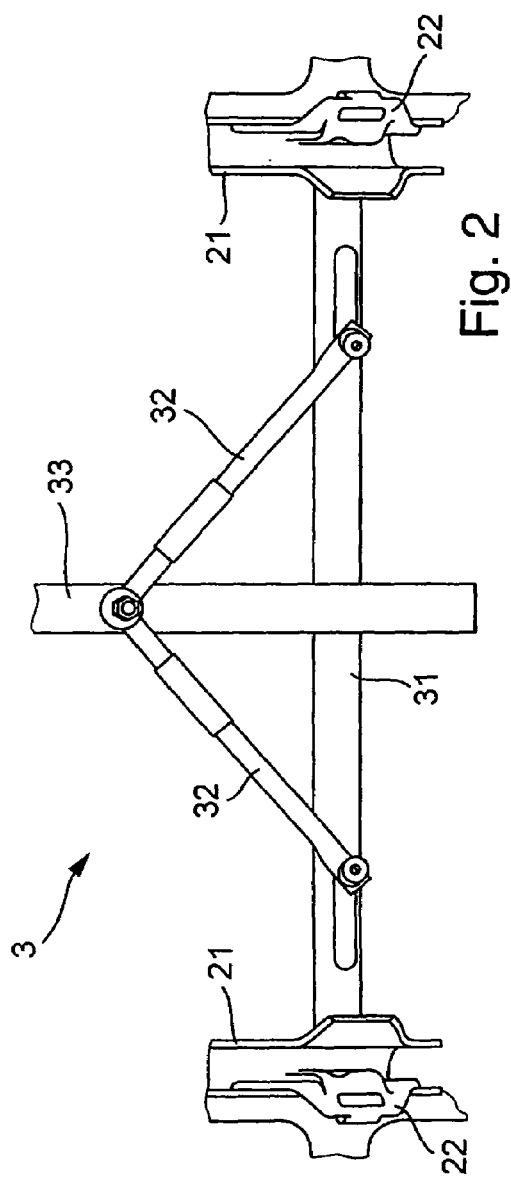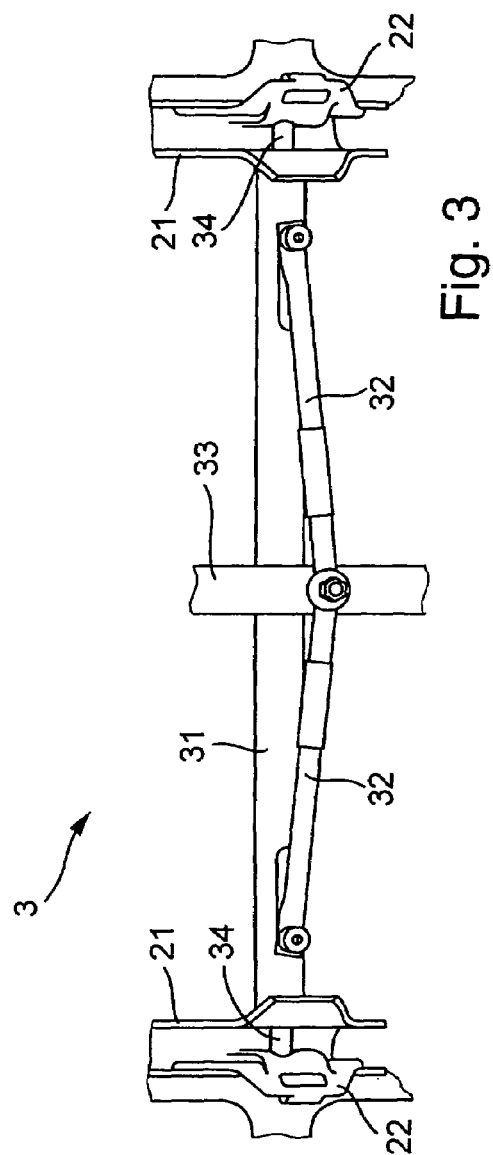

VEHICLE SEAT WITH BACK REST

This invention relates to a vehicle seat.

Such a vehicle seat is known from German publication DE 199 49 728 A1. The vehicle seat which is shown there is mounted displaceably in a vehicle by means of rails. It has a backrest, which is guided in a sliding block guide.

In modern vehicles, the construction space is often very limited. In the rear, in particular, space is very cramped and is often additionally blocked by installations and coverings and is inaccessible. Nevertheless, a vehicle seat must be able to be connected rapidly and securely to the vehicle. For reasons of space and/or time, known connecting methods, such as, for example, screwing the backrest to a rear wall, are not economically feasible.

The object of the present invention is to provide a vehicle seat with a backrest, which is of compact configuration and, at the same time, can be easily and quickly fitted. In particular, the vehicle seat should be able to be securely connected to the vehicle structure.

This object is achieved according to the invention.

The vehicle seat has a releasable locking mechanism, which is configured for the securement of the backrest in a sliding block guide. The locking mechanism can be operated, i.e. locked or unlocked, manually. If the locking mechanism is unlocked, the backrest can be easily installed in a vehicle and can be fastened there by operation of the locking mechanism. Simple removal of the vehicle seat, e.g. for maintenance or repair works, is also possible. For this, the locking mechanism of the backrest is released manually, whereupon the seat, preferably the backrest, is easily removable from the vehicle.

In one embodiment, it is envisaged that the backrest is guided in a sliding block guide, which is connected to the vehicle structure and has two slideways. On each side of the backrest, a slideway is provided. The locking mechanism of the backrest engages in the slideways with two bolts and in this way connects the backrest to the vehicle structure. The backrest is thus on both sides firmly and securely anchored and supported in the slideways by the bolts of the locking mechanism and, at the same time, guided displaceably in the slideways.

It is envisaged that the backrest, in one embodiment, has a tube running transversely to the backrest and supporting the bolts of the locking mechanism. The tube is preferably configured such that it passes right across the width of the backrest and is connected to a bearing structure of the backrest, preferably the frame of the backrest. The bolts of the locking mechanism can be mounted in the tube in an axially displaceable manner.

By means of a draw band which cooperates with the bolts and is manually operated, or a chain, the bolts can be axially displaced and hence disengaged from the slideways in order to anchor the backrest in engagement with the slideways and/or release the backrest.

In an advantageous embodiment, it is envisaged that the draw band and/or the chain is configured to indicate the correct locking position of the backrest. For this, the chain and/or the draw band can have a marking, which, in the locked position of the bolts, coincides with a marking fixedly disposed on the vehicle seat. If the vehicle seat or the backrest has not been properly locked, then the bolts cannot be extended into their end position by means of the draw band and/or the chain and the marking on the chain and/or the draw band fails to coincide with the marking on the seat.

According to one embodiment, the marking on the draw band is configured as a hook and/or eyelet and/or shackle. The marking fixedly disposed on the vehicle seat is accordingly configured as a pin and/or hook, so that, if the backrest is correctly locked, the draw band and/or the chain can be hung from the seat, preferably can be fixed thereto, by joining up the markings.

It is possible to use the vehicle seat according to the invention in passenger vehicles, buses and water craft or rail vehicles. Use of the vehicle seat according to the invention as a comfortable passenger chair in aircraft is also envisaged.

Further features and embodiments of the invention can be derived from the claims, the figures and the description of the figures. The aforementioned and below-stated features and combinations of features can be used not only in the respectively indicated combination but also in isolation, without departing from the scope of the invention.

Further embodiments of the invention are represented and explained in the drawings.

BRIEF DESCRIPTION OF THE DRAWINGS

FIG. 2 shows a representation of the opened locking mechanism, FIG. 3 shows a representation of the locked locking mechanism.

DETAILED DESCRIPTION OF THE INVENTION

Figure 1:
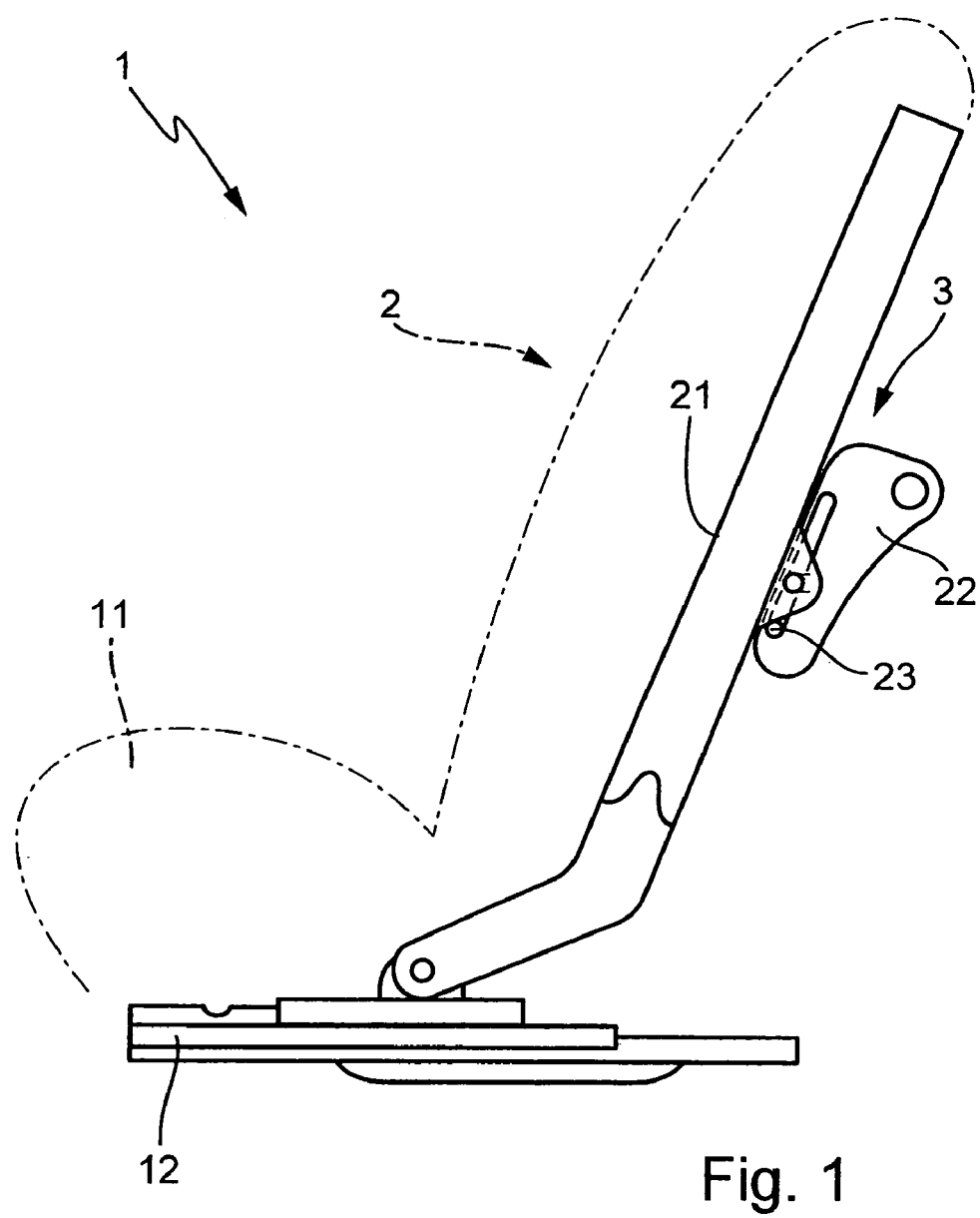
FIG. 1 shows a vehicle seat with backrest and locking mechanism in schematic side view.

FIG. 1 shows a vehicle seat 1 having a backrest 2 and a seat cushion 11. The vehicle seat 1 is mounted displaceably in a vehicle by means of rails 12. The contour of the padding of the backrest and seat cushion is indicated with hatching. The backrest 2 has an upholstered backrest frame 21 and is mounted displaceably in a sliding block guide 22, with slideways 23, which is fastened in the vehicle. In addition, the backrest 2 is connected to the seat cushion and the rails 12, e.g. hung or inserted, such that it is pivotable and easily detachable.

Through displacement in the vehicle of the seat cushion 11, guided displaceably in the rails 12, the backrest 2 hinge-connected to the seat cushion 11 is displaced in its lower region likewise in the direction of the seat cushion 11. As a result of the guidance of the backrest 2 in the slideways 23, the height and angle of the backrest 2 are altered by the adjustment of the seat cushion 11. The seat occupant can thus freely choose and/or adjust his seating position between a rather upright seating position and a rather angled rest position.

By means of a locking mechanism 3, represented in greater detail in FIGS. 2 to 5, the backrest 2 is detachably connected to the vehicle-fixed sliding block guide 22. The locking mechanism is disposed approximately halfway up the backrest 2 and is symmetrical in structure. It comprises a transverse tube 31 and two bolts 34, engaging in the slideways 23 disposed to the left and right of the backrest 2, as well as a centrally running draw band 33, connected to the bolts 34 by levers 32.

The transverse tube 31 runs transversely to the backrest 2 and is connected fixedly to the backrest frame 21. It supports the two bolts 34 in an axially displaceable manner in a long hole, the bolts 34 being displaceable beyond the open ends of the transverse tube 31. The backrest frame 21 has two side members joined together at their one front face, so that the cross section of the backrest frame is of approximate U-shaped configuration. In the space between the two side members of the backrest frame 21, the sliding block guide 22 engages on both sides of the backrest at the level of the transverse tube 31. The inner side member of the backrest frame 21 is connected to the transverse tube 31 and has an opening through which the bolt 34 can reach. Disposed in alignment with this opening is the opening in the slideway 23 and an opening in the second side member of the backrest frame 21.

Figure 4:
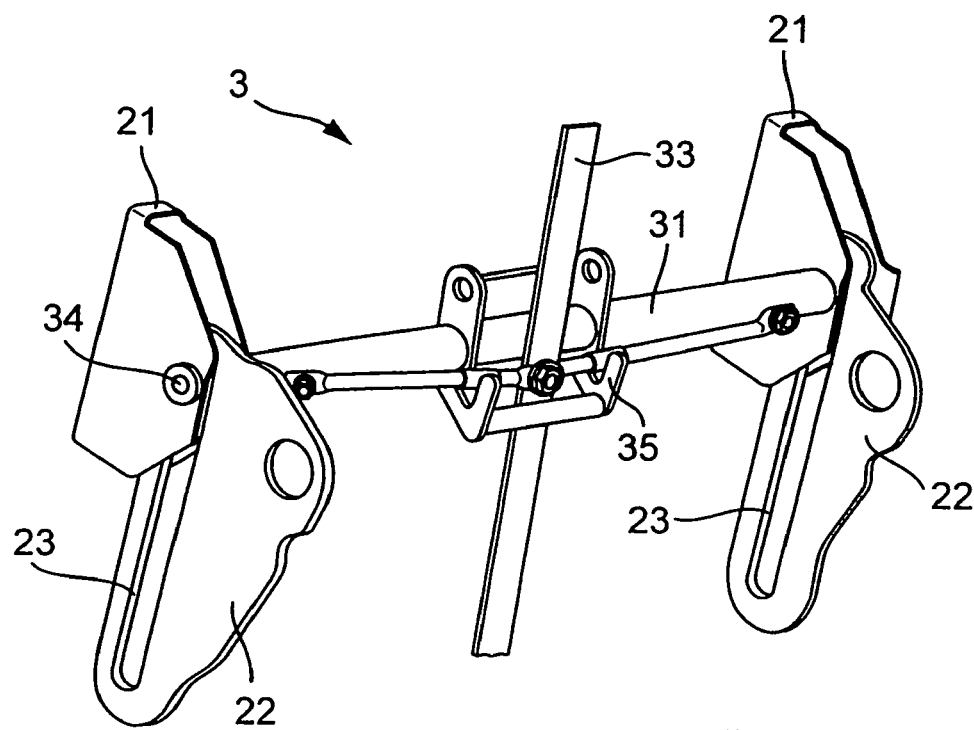
FIG. 4 shows a perspective representation of the locked locking mechanism.
Figure 5:
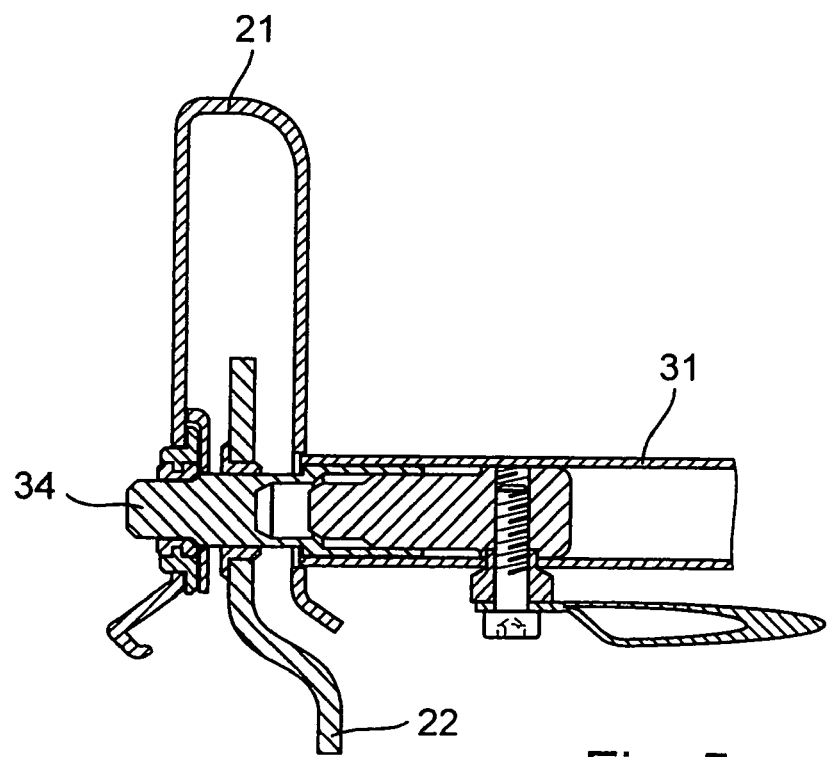
FIG. 5 shows an enlarged representation of the bolt of the locking mechanism.

As represented in FIG. 3 or FIG. 4, if the locking mechanism 3 is locked, the bolt 34 disposed on both sides of the backrest 2 reaches through the slideway 23 and back-grips the opening in the outer side member of the backrest frame 21. The locking mechanism 3 in this way secures the backrest 2 firmly in the vehicle. If the locking mechanism 3 is unlocked, the bolts 34, as represented in FIG. 2, are fully withdrawn into the transverse tube 31 and are disengaged from the slideways 23, so that the backrest 2 is easily removable from the vehicle.

The two levers 32 are rotatably connected at their one end to a respective bolt 34. At their other end, the levers 32 are joined rotatably together and connected to the draw band 33. The draw band runs along behind the vehicle seat 1 and is accessible on the top side of the backrest 2 from above and on the seat cushion 11 from below. It can be operated manually. For locking purposes, the draw band 33 can be drawn downward, whereby the bolts 34 are displaced outward by means of the levers 32. A stop 35 herein limits the downward travel of the draw band 33 and is arranged such that, in the locked setting, the levers 32, beyond the mid-position of precisely 180°, stand at a shallow angle to each other. Any play in the locking mechanism 3 is thereby compensated and a stable locking position obtained. In the unlocking process, the draw band 33 is drawn upward. By means of the levers 32, the bolts 34 are displaced inward and release the backrest 2.

Figure 6:
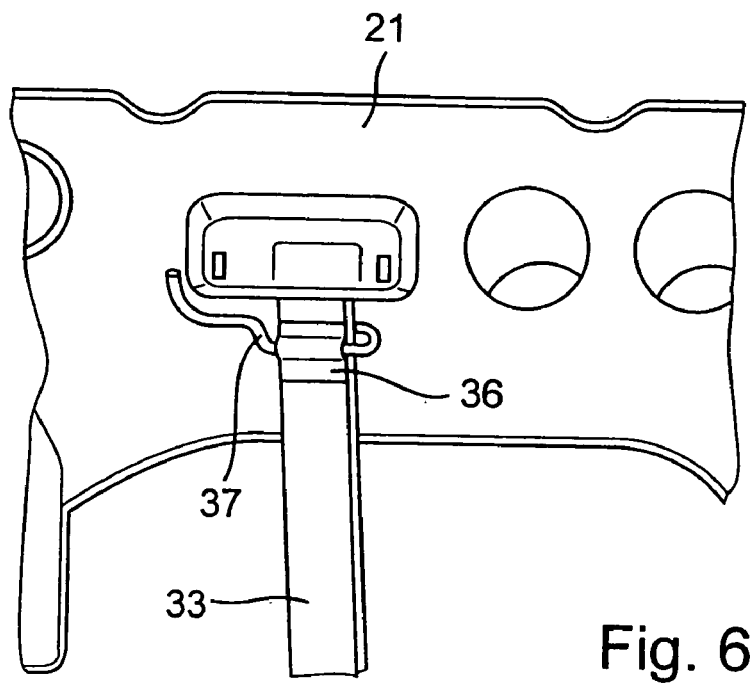
FIG. 6 shows a representation of the hanging of the draw band in the top of the vehicle seat.
Figure 7:
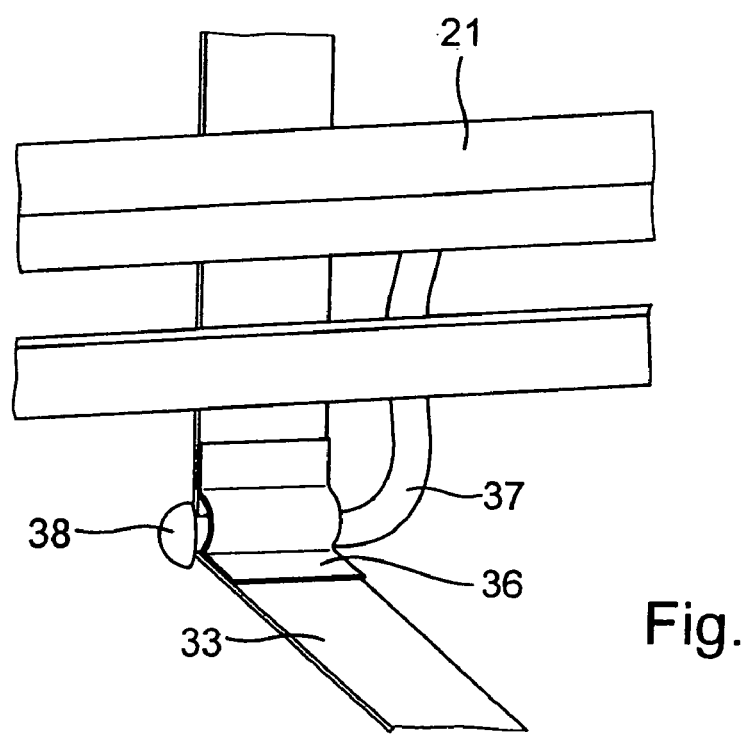
FIG. 7 shows a representation of the hanging of the draw band in the bottom of the vehicle seat.

Over the path of the draw band 33, the locking of the backrest 2 is able to be checked. If the backrest is correctly positioned, then the draw band 33 is drawn downward from the setting shown in FIG. 2 into the setting shown in FIGS. 3 and 4. If the backrest 2, for example, is not correctly positioned or if one of the openings cannot be passed through freely, then the levers 32 cannot be operated into the locking end position. The path covered by the draw band is thus smaller. As represented in FIG. 6 or FIG. 7, the draw band 33 has a shackle 36, which is disposed on the draw band at such a measurement-defined location that it can be hung in a pin 37 disposed on the seat frame 21 only if the backrest 2 is correctly locked. In cooperation with the pin 37, this marking in the form of the shackle 36 allows the correct locking of the backrest 2 to be checked, in spite of the locking mechanism 3 not being visible.

In order to prevent the locking mechanism 3 from being accidentally opened, the draw band 33, on the pin 37, is protected from slipping off. As shown in FIG. 7, the pin 37 has a check nut 38, which prevents accidental release of the draw band 33. After the draw band 33 has been hung, the check nut 38 is screwed onto the pin 37, so that the draw band 33 cannot detach accidentally from the pin 37.

The invention claimed is:

1. A vehicle seat comprising:
   a backrest, and
   sliding block guides disposed in vehicle-fixed arrangement at sides of the backrest by which the backrest is mounted displaceably,
   wherein the backrest has a locking mechanism which can be operated by a draw band running centrally of the backrest between laterally opposite sides of the backrest and configured to secure the backrest in the sliding block guides, and
   wherein the draw band has a marking which can be hung in a mounting only if the backrest is currently locked.

2. The vehicle seat as claimed in claim 1, wherein the vehicle seat is adjustable between a seating position and an angled rest position.

3. The vehicle seat as claimed in claim 1, wherein the sliding block guides have two slideways, wherein a respective one of the slideways is disposed on either side of the backrest, and wherein the locking mechanism has two bolts, a respective one of said bolts engaging in a respective one of said slideways in order to secure the backrest.

4. The vehicle seat as claimed in claim 3, wherein the backrest has a transverse-running tube, which supports the bolts in an axially displaceable manner.

5. The vehicle seat as claimed in claim 3, wherein the bolts are joined together by a toggle lever linkage having two hinge-connected levers.

6. The vehicle seat as claimed in claim 5, wherein the draw band cooperates with the toggle lever linkage for axial displacement of the bolts.

7. The vehicle seat as claimed in claim 3, wherein the draw band cooperates with a toggle lever linkage for axial displacement of the bolts.

8. A vehicle seat comprising:
   a backrest, and
   sliding block guides disposed in vehicle-fixed arrangement at sides of the backrest by which the backrest is mounted displaceably,
   wherein the backrest has a locking mechanism which can be operated by a draw band running centrally of the backrest between laterally opposite sides of the backrest and configured to secure the backrest in the sliding block guides,
   wherein the draw band has a marking for indicating correct locking of the backrest, and
   wherein the marking is configured as a shackle, eyelet, or hook and can be hung in a mounting only if the backrest is correctly locked.

9. The vehicle seat as claimed in claim 8, wherein the mounting is a pin.

10. The vehicle seat as claimed in claim 8, wherein the sliding block guide has two slideways, wherein a respective one of the slideways is disposed on either side of the backrest, and wherein the locking mechanism has two bolts, a respective one of said bolts engaging in a respective one of said slideways in order to secure the backrest.

11. The vehicle seat as claimed in claim 10, wherein the backrest has a transverse-running tube, which supports the bolts in an axially displaceable manner.

12. The vehicle seat as claimed in claim 11, wherein the bolts are joined together by a toggle lever linkage having two hinge-connected levers.

13. The vehicle seat as claimed in claim 10, wherein the bolts are joined together by a toggle lever linkage having two hinge-connected levers.

14. A vehicle seat comprising:
a backrest, and
sliding block guides disposed in vehicle-fixed arrangement at sides of the backrest by which the backrest is mounted displaceably,
wherein the backrest has a locking mechanism which can be operated by a draw band running centrally of the backrest between laterally opposite sides of the backrest and configured to secure the backrest in the sliding block guides,
wherein the draw band has a marking for indicating correct locking of the backrest,
wherein the sliding block guides have two slideways,
wherein a respective one of the slideways is disposed on either side of the backrest,
wherein the locking mechanism has two bolts, a respective one of said bolts engaging in a respective one of said slideways in order to secure the backrest,
wherein the backrest has a transverse-running tube, which supports the bolts in an axially displaceable manner, and
wherein the bolts are joined together by a toggle lever linkage having two hinge-connected levers.

15. A vehicle seat comprising:
a backrest, and
sliding block guides disposed in vehicle-fixed arrangement at sides of the backrest by which the backrest is mounted displaceably,
wherein the backrest has a locking mechanism which can be operated by a draw band running centrally of the backrest between laterally opposite sides of the backrest and configured to secure the backrest in the sliding block guides,
wherein the draw band has a marking for indicating correct locking of the backrest,
wherein the sliding block guides have two slideways,
wherein a respective one of the slideways is disposed on either side of the backrest,
wherein the locking mechanism has two bolts, a respective one of said bolts engaging in a respective one of said slideways in order to secure the backrest,
wherein the backrest has a transverse-running tube, which supports the bolts in an axially displaceable manner, and
wherein the draw band cooperates with a toggle lever linkage for axial displacement of the bolts.

* * * * *